(12) United States Patent
Takeda et al.

(10) Patent No.: US 12,598,040 B2
(45) Date of Patent: Apr. 7, 2026

(54) RESOURCE BLOCK GROUP SIZES

(71) Applicant: QUALCOMM Incorporated, San Diego, CA (US)

(72) Inventors: Kazuki Takeda, Minato-ku (JP); Mostafa Khoshnevisan, San Diego, CA (US); Peter Gaal, San Diego, CA (US); Jae Ho Ryu, San Diego, CA (US); Changhwan Park, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 18/167,507

(22) Filed: Feb. 10, 2023

(65) Prior Publication Data

US 2024/0275543 A1 Aug. 15, 2024

(51) Int. Cl.
H04L 5/00 (2006.01)

(52) U.S. Cl.
CPC .......... H04L 5/0048 (2013.01); H04L 5/0005 (2013.01); H04L 5/0064 (2013.01)

(58) Field of Classification Search
None
See application file for complete search history.

(56) References Cited

U.S. PATENT DOCUMENTS

2017/0105233 A1* 4/2017 Zhang ............... H04W 72/1215
2018/0227885 A1* 8/2018 Lee ......................... H04L 5/001

2019/0215212 A1* 7/2019 Park ...................... H04L 5/0007
2019/0222404 A1* 7/2019 Ang ...................... H04L 5/0041
2020/0404667 A1* 12/2020 Khoshnevisan ...... H04L 5/0039
2021/0037525 A1* 2/2021 Xu ......................... H04W 72/02
2021/0307014 A1* 9/2021 Abotabl ................... H04L 5/14
2021/0321400 A1* 10/2021 Takeda .................. H04L 5/0094
2022/0086894 A1* 3/2022 Papasakellariou .... H04L 5/0053
2022/0173851 A1* 6/2022 Shi ........................ H04L 5/0035

(Continued)

FOREIGN PATENT DOCUMENTS

EP 4550908 A1 * 5/2025 ........... H04L 5/0094
WO WO-2018232284 A1 12/2018

(Continued)

OTHER PUBLICATIONS

International Search Report and Written Opinion—PCT/US2024/014507—ISA/EPO—Jun. 11, 2024 (2301877WO).

(Continued)

*Primary Examiner* — Nicholas Sloms

(74) *Attorney, Agent, or Firm* — QUALCOMM Incorporated

(57) ABSTRACT

Methods, systems, and devices for wireless communications are described. A user equipment (UE) may receive a first control message including a resource block group size parameter that includes a resource block group size configuration. The UE may receive a single second control message scheduling a plurality of transmissions in a plurality of cells and including a plurality of frequency domain resource allocation fields indicating a plurality of resource block groups. The UE may communicate a first transmission in one or more resource block groups of the plurality of resource block groups in accordance with a first resource block group size.

30 Claims, 14 Drawing Sheets

(56) References Cited

U.S. PATENT DOCUMENTS

| | | | |
|---|---|---|---|
| 2022/0272744 A1* | 8/2022 | Noh | H04W 72/0453 |
| 2023/0034987 A1* | 2/2023 | Yi | H04L 5/0091 |
| 2023/0073686 A1 | 3/2023 | Li et al. | |
| 2023/0085896 A1* | 3/2023 | Takeda | H04L 5/0044 |
| 2024/0196413 A1* | 6/2024 | Chatterjee | H04L 5/0053 |
| 2024/0204931 A1* | 6/2024 | Xiong | H04L 5/0053 |
| 2024/0340702 A1* | 10/2024 | Zhang | H04W 72/232 |

FOREIGN PATENT DOCUMENTS

| | | |
|---|---|---|
| WO | WO-2021223703 A1 | 11/2021 |
| WO | WO-2024000551 A1 | 1/2024 |

OTHER PUBLICATIONS

NEC: "DL/UL Resource Allocation Schemes and TBS Determination", R1-1717152, 3GPP TSG RAN WG1 Meeting #90, DL-UL RA Schemes For NR V2B, 3rd Generation Partnership Project, Mobile Competence Centre, 650, Route Des Lucioles, F-06921 Sophia-Antipolis Cedex, France vol. RAN WG1, No. Prague, Czech Republic, Oct. 9, 2017-Oct. 13, 2017 Oct. 8, 2017, XP051340342, 11 Pages, Section 2.1.

3GPP: 3rd Generation Partnership Project, Technical Specification Group Radio Access Network, NR, Physical Layer Procedures for Data Release 17), 3GPP Organizational Partners, Sophia Antipolis Valbonne, France, 3GPP TS 38.214 V17.4.0, Dec. 2022, pp. 23-24, pp. 1-230.

3GPP: 3rd Generation Partnership Project, Technical Specification Group Radio Access Network, NR, Radio Resource Control (RRC) protocol specification (Release 17), 3GPP Organizational Partners, Sophia Antipolis Valbonne, France, 3GPP TS 38.331 V17.3.0, Dec. 2022, pp. 713-720, pp. 1-1315.

MCC Support: "Final Report of 3GPP TSG RAN WG1 #110bis-e v1.0.0 (Online, Oct. 10-19, 2022)", 3GPP TSG RAN WG1 Meeting #111, R1-2210801, pp. 155-156, Toulouse, France, Nov. 14-18, 2022, 206 pages.

* cited by examiner

| BWP Size | Configuration 1 | Configuration 2 | Configuration 3 |
|----------|-----------------|-----------------|-----------------|
| 1 – 36 | 2 | 4 | 4 |
| 37 – 72 | 4 | 8 | 8 |
| 73 – 144 | 8 | 16 | 16 |
| 145 – 275 | 16 | 16 | 32 |

| BWP Size | Configuration 1 | Configuration 2 |
|----------|-----------------|-----------------|
| 1 – 36 | 2 | 4 |
| 37 – 72 | 4 | 8 |
| 73 – 144 | 8 | 16 |
| 145 – 275 | 16 | 16 / 32 |

510

520

515

505

500

Communications Manager

First Control Message
Component

625

Receiver

610

Second Control Message
Component

630

Transmitter

615

Transmission Communication
Component

635

620

605

130

105

115

Network
Entity

Transceiver

1210

Antenna

1215

Communications
Manager

1220

Memory

Code

1230

1225

1240

Processor

1235

1205

1200

Figure 13:
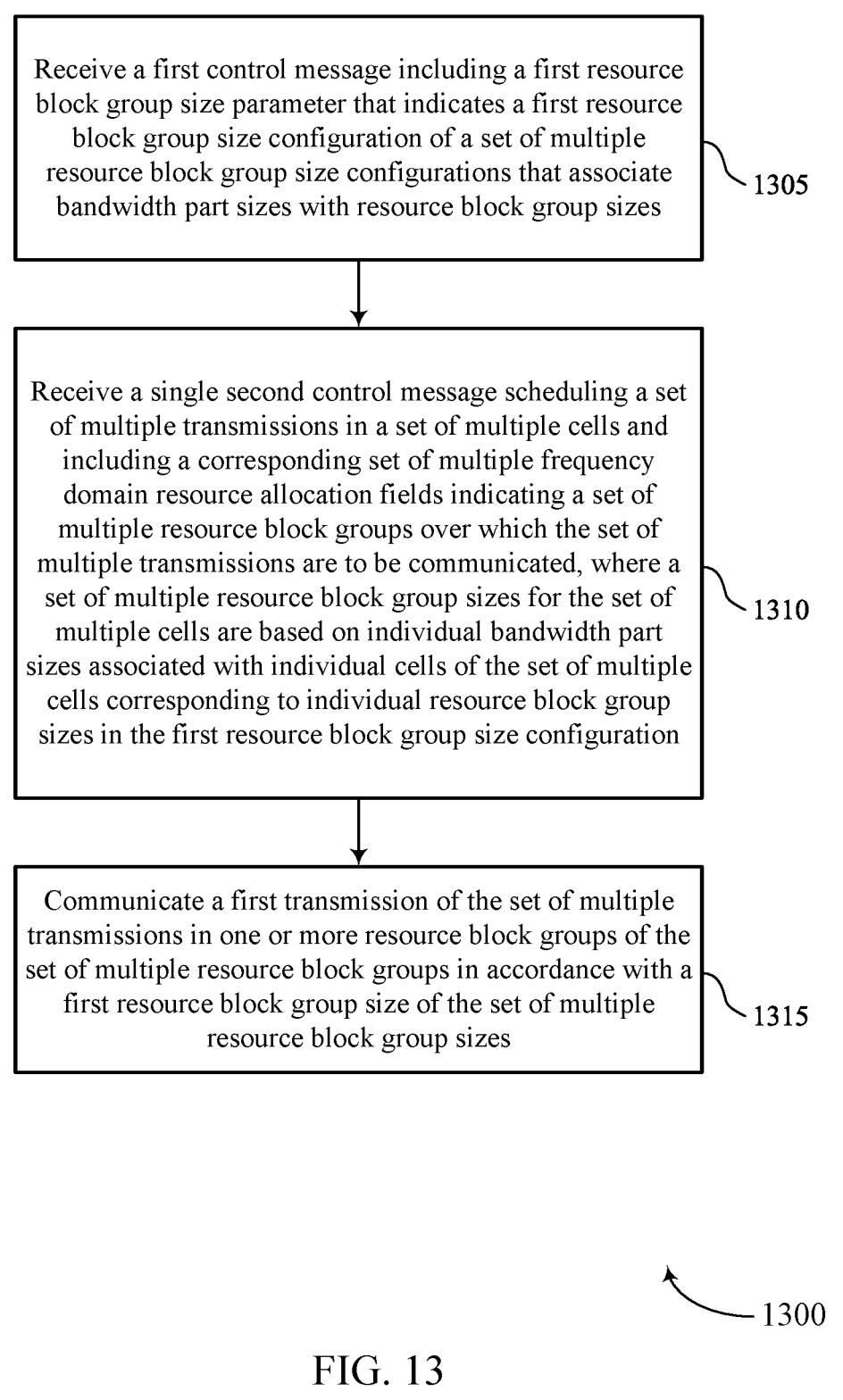

Receive a first control message including a first resource block group size parameter that indicates a first resource block group size configuration of a set of multiple resource block group size configurations that associate bandwidth part sizes with resource block group sizes

1305

Receive a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration

1310

Communicate a first transmission of the set of multiple transmissions in one or more resource block groups of the set of multiple resource block groups in accordance with a first resource block group size of the set of multiple resource block group sizes

Figure 14:
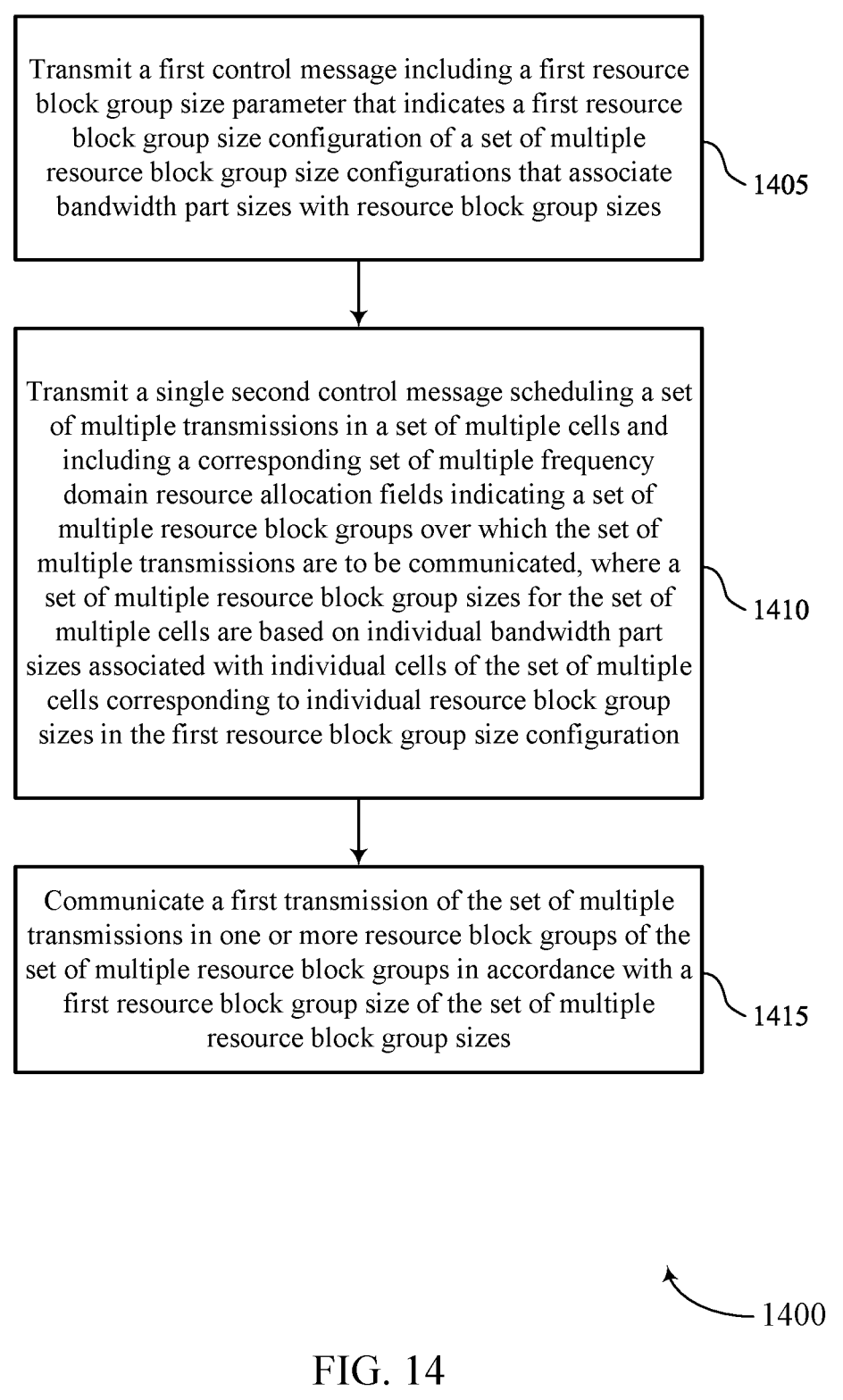

Transmit a first control message including a first resource block group size parameter that indicates a first resource block group size configuration of a set of multiple resource block group size configurations that associate bandwidth part sizes with resource block group sizes

1405

Transmit a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration

1410

Communicate a first transmission of the set of multiple transmissions in one or more resource block groups of the set of multiple resource block groups in accordance with a first resource block group size of the set of multiple resource block group sizes

RESOURCE BLOCK GROUP SIZES

FIELD OF TECHNOLOGY

The following relates to wireless communications, including resource block group sizes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, multiple transmissions may be scheduled across multiple cells. However, such approaches may be improved.

SUMMARY

The described techniques relate to improved methods, systems, devices, and apparatuses that support resource block group sizes. A user equipment (UE) may receive a first control message including a first resource block group size parameter that includes a first resource block group size configuration that associates bandwidth part sizes with resource block group sizes. The UE may receive a single second control message scheduling a plurality of transmissions in a plurality of cells and including a corresponding plurality of frequency domain resource allocation fields indicating a plurality of resource block groups. The plurality of resource block group sizes for the plurality of cells may be based on bandwidth part sizes associated with cells of the plurality of cells corresponding to resource block group sizes in the first resource block group size configuration. The UE may communicate a first transmission in one or more resource block groups of the plurality of resource block groups in accordance with a first resource block group size.

A method for wireless communications at a user equipment (UE) is described. The method may include receiving a first control message including a first resource block group size parameter that indicates a first resource block group size configuration of a set of multiple resource block group size configurations that associate bandwidth part sizes with resource block group sizes, receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicating a first transmission of the set of multiple transmissions in one or more resource block groups of the set of multiple resource block groups in accordance with a first resource block group size of the set of multiple resource block group sizes.

An apparatus for wireless communications at a UE is described. The apparatus may include a processor, memory coupled with the processor, and instructions stored in the memory. The instructions may be executable by the processor to cause the apparatus to receive a first control message including a first resource block group size parameter that indicates a first resource block group size configuration of a set of multiple resource block group size configurations that associate bandwidth part sizes with resource block group sizes, receive a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicate a first transmission of the set of multiple transmissions in one or more resource block groups of the set of multiple resource block groups in accordance with a first resource block group size of the set of multiple resource block group sizes.

Another apparatus for wireless communications at a UE is described. The apparatus may include means for receiving a first control message including a first resource block group size parameter that indicates a first resource block group size configuration of a set of multiple resource block group size configurations that associate bandwidth part sizes with resource block group sizes, means for receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and means for communicating a first transmission of the set of multiple transmissions in one or more resource block groups of the set of multiple resource block groups in accordance with a first resource block group size of the set of multiple resource block group sizes.

A non-transitory computer-readable medium storing code for wireless communications at a UE is described. The code may include instructions executable by a processor to receive a first control message including a first resource block group size parameter that indicates a first resource block group size configuration of a set of multiple resource block group size configurations that associate bandwidth part sizes with resource block group sizes, receive a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicate a first transmission of the set of multiple transmissions in one or more resource block groups of the set of multiple resource block groups in accordance with a first resource block group size of the set of multiple resource block group sizes.

In some examples of the method, apparatuses, and non-transitory computer-readable medium described herein, the set of multiple resource block group size configurations includes at least three configurations and the first resource block group size configuration includes a maximum resource block group size that may be greater than all other maximum resource block group sizes included in the set of multiple resource block group size configurations.

In some examples of the method, apparatuses, and non-transitory computer-readable medium described herein, the maximum resource block group size of the first resource block group size configuration may be greater than sixteen resource blocks.

In some examples of the method, apparatuses, and non-transitory computer-readable medium described herein, the first resource block group size parameter may be applicable to multiple transmissions scheduled by a single control message.

In some examples of the method, apparatuses, and non-transitory computer-readable medium described herein, a maximum resource block group size of the first resource block group size configuration may be greater than sixteen resource blocks.

Some examples of the method, apparatuses, and non-transitory computer-readable medium described herein may further include operations, features, means, or instructions for determining that one or more conditions may be satisfied, determining that a maximum resource block group size of the first resource block group size configuration may be greater than sixteen resource blocks based on determining that the one or more conditions may be satisfied, and where the first resource block group size may be the maximum resource block group size of the first resource block group size configuration.

In some examples of the method, apparatuses, and non-transitory computer-readable medium described herein, the one or more conditions include receiving the first resource block group size parameter indicating the first resource block group size configuration, a format of the single second control message, a bandwidth part size, or any combination thereof.

Some examples of the method, apparatuses, and non-transitory computer-readable medium described herein may further include operations, features, means, or instructions for receiving the first control message including a set of multiple resource block group size parameters associated with the set of multiple cells, the set of multiple resource block group size parameters indicating respective resource block group size configurations of the set of multiple resource block group size configurations, where the set of multiple resource block group size parameters includes the first resource block group size parameter.

In some examples of the method, apparatuses, and non-transitory computer-readable medium described herein, the set of multiple frequency domain resource allocation fields indicate the set of multiple resource block groups in accordance with a resource allocation type that allocates resources corresponding to the first resource block group size.

In some examples of the method, apparatuses, and non-transitory computer-readable medium described herein, the first control message may be a radio resource control message and the second control message may be a downlink control information message.

A method for wireless communications at a network entity is described. The method may include transmitting a first control message including a first resource block group size parameter that indicates a first resource block group size configuration of a set of multiple resource block group size configurations that associate bandwidth part sizes with resource block group sizes, transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicating a first transmission of the set of multiple transmissions in one or more resource block groups of the set of multiple resource block groups in accordance with a first resource block group size of the set of multiple resource block group sizes.

An apparatus for wireless communications at a network entity is described. The apparatus may include a processor, memory coupled with the processor, and instructions stored in the memory. The instructions may be executable by the processor to cause the apparatus to transmit a first control message including a first resource block group size parameter that indicates a first resource block group size configuration of a set of multiple resource block group size configurations that associate bandwidth part sizes with resource block group sizes, transmit a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicate a first transmission of the set of multiple transmissions in one or more resource block groups of the set of multiple resource block groups in accordance with a first resource block group size of the set of multiple resource block group sizes.

Another apparatus for wireless communications at a network entity is described. The apparatus may include means for transmitting a first control message including a first resource block group size parameter that indicates a first resource block group size configuration of a set of multiple resource block group size configurations that associate bandwidth part sizes with resource block group sizes, means for transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and means for communicating a first transmission of the set of multiple transmissions in one or more resource block groups of the set of multiple resource block groups in accordance with a first resource block group size of the set of multiple resource block group sizes.

A non-transitory computer-readable medium storing code for wireless communications at a network entity is described. The code may include instructions executable by a processor to transmit a first control message including a first resource block group size parameter that indicates a first resource block group size configuration of a set of multiple resource block group size configurations that associate bandwidth part sizes with resource block group sizes, transmit a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration, and communicate a first transmission of the set of multiple transmissions in one or more resource block groups of the set of multiple resource block groups in accordance with a first resource block group size of the set of multiple resource block group sizes.

In some examples of the method, apparatuses, and non-transitory computer-readable medium described herein, the set of multiple resource block group size configurations includes at least three configurations and the first resource block group size configuration includes a maximum resource block group size that may be greater than all other maximum resource block group sizes included in the set of multiple resource block group size configurations.

In some examples of the method, apparatuses, and non-transitory computer-readable medium described herein, the maximum resource block group size of the first resource block group size configuration may be greater than sixteen resource blocks.

In some examples of the method, apparatuses, and non-transitory computer-readable medium described herein, the first resource block group size parameter may be applicable to multiple transmissions scheduled by a single control message.

In some examples of the method, apparatuses, and non-transitory computer-readable medium described herein, a maximum resource block group size of the first resource block group size configuration may be greater than sixteen resource blocks.

Some examples of the method, apparatuses, and non-transitory computer-readable medium described herein may further include operations, features, means, or instructions for determining that one or more conditions may be satisfied, determining that a maximum resource block group size of the first resource block group size configuration may be greater than sixteen resource blocks based on determining that the one or more conditions may be satisfied, and where the first resource block group size may be the maximum resource block group size of the first resource block group size configuration.

In some examples of the method, apparatuses, and non-transitory computer-readable medium described herein, the one or more conditions include receiving the first resource block group size parameter indicating the first resource block group size configuration, a format of the single second control message, a bandwidth part size, or any combination thereof.

Some examples of the method, apparatuses, and non-transitory computer-readable medium described herein may further include operations, features, means, or instructions for transmitting the first control message including a set of multiple resource block group size parameters associated with the set of multiple cells, the set of multiple resource block group size parameters indicating respective resource block group size configurations of the set of multiple resource block group size configurations, where the set of multiple resource block group size parameters includes the first resource block group size parameter.

In some examples of the method, apparatuses, and non-transitory computer-readable medium described herein, the set of multiple frequency domain resource allocation fields indicate the set of multiple resource block groups in accordance with a resource allocation type that allocates resources corresponding to the first resource block group size.

In some examples of the method, apparatuses, and non-transitory computer-readable medium described herein, the first control message may be a radio resource control message and the second control message may be a downlink control information message.

BRIEF DESCRIPTION OF THE DRAWINGS

FIGS. 13 and 14 illustrate flowcharts showing methods that support resource block group sizes in accordance with one or more examples as disclosed herein.

DETAILED DESCRIPTION

In wireless communications, multiple transmissions across multiple cells may be scheduled by a single control message (e.g., a downlink control information (DCI) message, such as a DCI message of a format 1_X or 0_X). Such a control message may indicate a frequency domain resource allocation (FDRA) for each of the transmissions which may be organized in resource block groups (RBGs). Further, control signaling (e.g., radio resource control (RRC) signaling) may include an RBG size parameter that indicates a configuration from which an RBG size to use for the FDRA may be determined (e.g., based on a bandwidth part (BWP) size). However, for larger bandwidth part sizes (e.g., above 145), existing RBG sizes (e.g., a size of 16) may involve large amounts of overhead of an allowable payload size of a DCI format.

Thus, an increased RBG size (e.g., 32) may be used in connection with multiple transmissions scheduled in a single control message. Such an increased RBG size may be included in one or more existing RBG size configurations selected or indicated by an RBG size parameter. Additionally, or alternatively, one or more additional RBG size configurations may be implemented that may include one or more increased RBG size values. In some examples, such modified or additional configurations may be applied for multiple communications scheduled by a single control message or may be applied for communications scheduled by other types of control messaging. In some examples, an RBG size configuration may be modified to provide different RBG size values depending on a type or format of received control signaling (e.g., DCI 1_X/0_X may be associated with an increased RBG size value compared to other types or formats of control signaling).

Aspects of the disclosure are initially described in the context of wireless communications systems. Aspects of the disclosure are then described with reference to a wireless communications system, a RBG size scheme, and a process flow. Aspects of the disclosure are further illustrated by and described with reference to apparatus diagrams, system diagrams, and flowcharts that relate to resource block group sizes.

Figure 1:
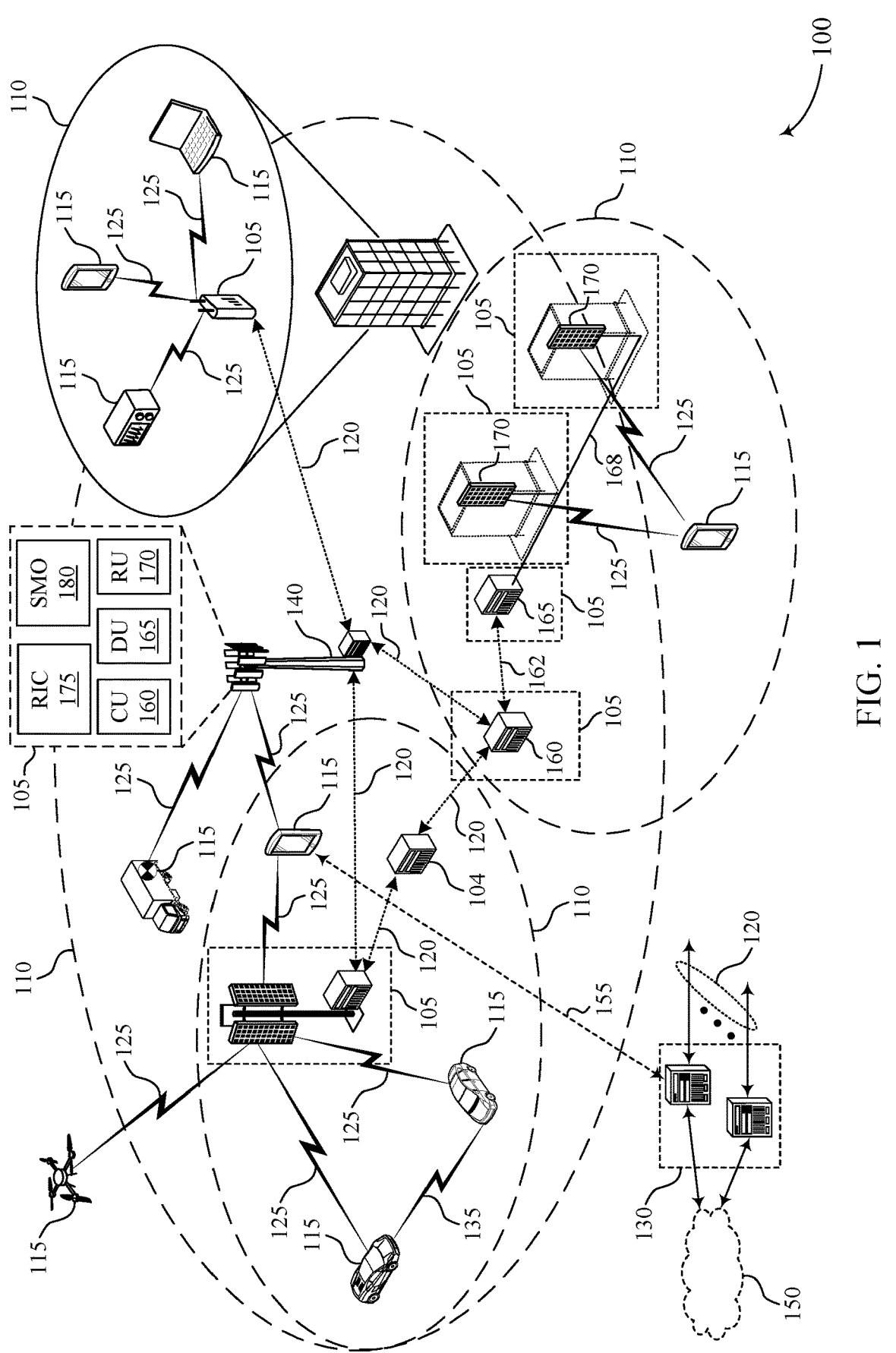
FIG. 1 illustrates an example of a wireless communications system that supports resource block group sizes in accordance with one or more examples as disclosed herein.

FIG. 1 illustrates an example of a wireless communications system 100 that supports resource block group sizes in accordance with one or more examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support resource block group sizes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The network entity 105 may transmit first control signaling that includes multiple RBG size parameters for multiple transmissions across multiple cells, each RBG size parameter indicating an RBG configuration that may include an increased or modified RBG size value (e.g., as compared to other RBG configurations). The network entity 105 may further schedule the multiple transmissions using a single second control message. The second control message may indicate a frequency domain resource allocation using RBGs of an RBG size in accordance with the indicated RBG configuration. This RBG size may be the increased or modified RBG size value. The network entity 105 and the UE 115 may communicate a transmission in accordance with the first control signaling and the second control signaling (e.g., in resources allocated usings RBGs of RBG sizes that are larger or modified as compared to other RBG sizes indicated in other RBG configurations).

Figure 2:
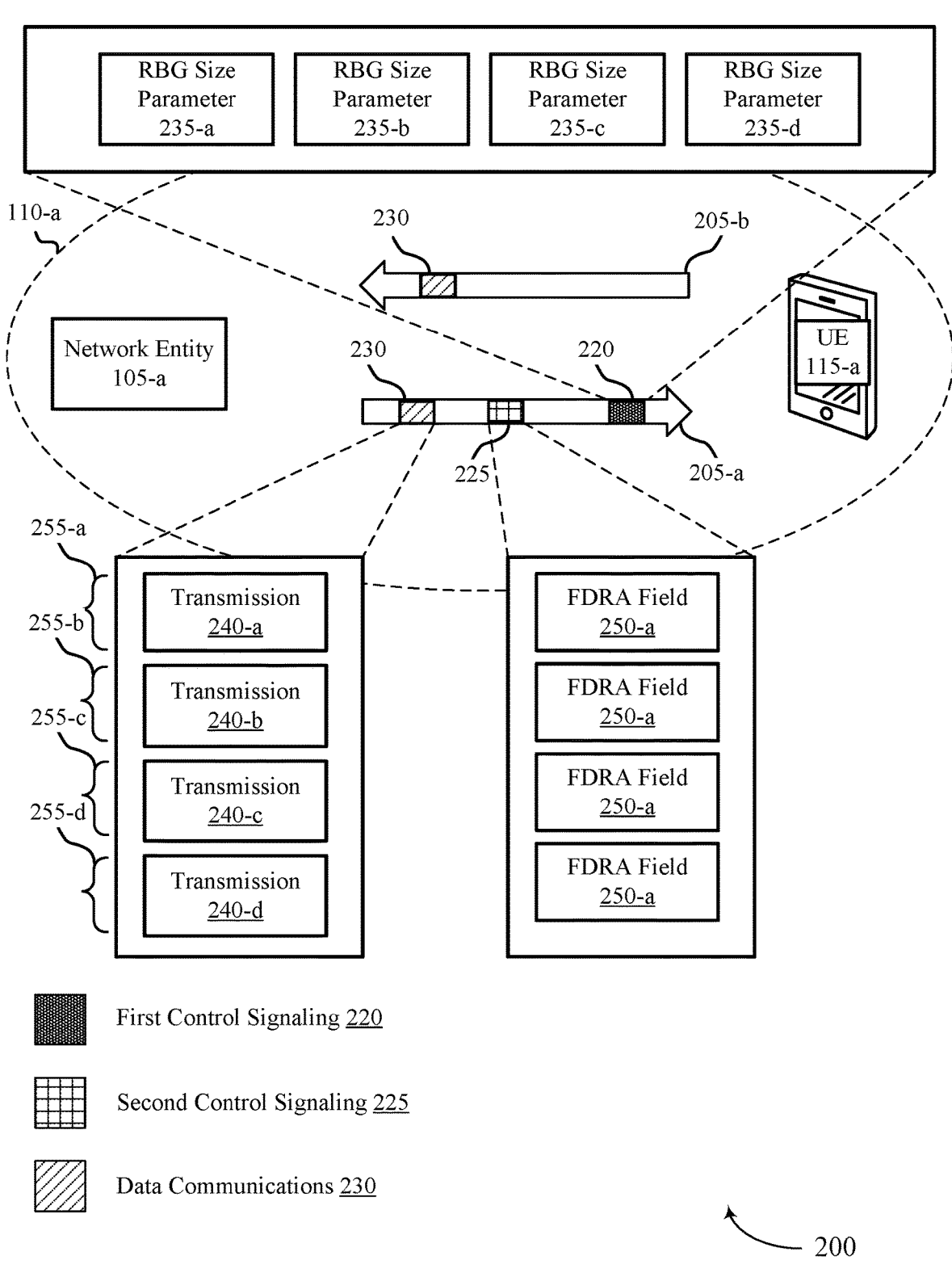
FIG. 2 illustrates an example of a wireless communications system that supports resource block group sizes in accordance with one or more examples as disclosed herein.

FIG. 2 illustrates an example of a wireless communications system 200 that supports resource block group sizes in accordance with one or more examples as disclosed herein. The wireless communications system 200 may include the network entity 105-*a*, which may be an example of one or more network entities discussed in relation to other figures. The wireless communications system 200 may include the UE 115-*b*, which may be an example of UEs discussed in relation to other figures.

In some examples, the UE 115 a may be located in a geographic coverage area 110-*a* that may be associated with the network entity 105-*a*. The network entity 105-*a* and ULE 115-*a* may communicate via one or more downlink communication links 205-*a* and one or more uplink communication links 205-*b*.

In the course of wireless communications, the network entity 105-*a* may schedule multiple transmissions 240 on one or more cells. For example, each transmission 240 may be transmitted on a different cell, or other quantities of transmission 240 may be transmitted over one or more cells. The transmissions 240 may be uplink transmissions, downlink transmissions, or any combination thereof.

In some examples, the network entity 105-*a* may schedule the transmissions 240 via the second control signaling 225. In some examples, the second control signaling 225 may be DCI control signaling. In some further examples, the second control signaling 225 may be of a DCI format, such as a DCI format that can schedule multiple transmissions on multiple cells (e.g., DCI format 0_X or DCI format 1_X, where X may be a number such as 3 indicating that the format is associated with simultaneous scheduling of multiple cells).

In some examples, the second control signaling may include one or more FDRA fields 250 that may indicate frequency domain resources for one or more transmissions, such as the transmissions 240. In some examples, the FDRA fields 250 may be a "per-cell" field. For example, each cell in which a transmission 240 is being scheduled may be associated with an FDRA field 250 that may indicate frequency domain resource for the corresponding transmission 240. Similarly, other fields in the second control signaling 225 may be "per-cell" fields, including modulation and coding scheme (MCS) fields, new data indicator (NDI) fields, redundancy version (RV) fields, hybrid automatic repeat request (HARQ) fields, or any combination thereof.

In some examples, the FDRA fields 250 in the second control signaling 225 may indicate the frequency domain resource allocations for the transmissions 240 by indicating RBGs, which may be groups of associated resource blocks. The size of the RBGs may be different in different scenarios and may be different based on one or more different factors. For example, each FDRA filed 250 may be a bitmap that indicates the RBGs allocated for a corresponding transmission 240.

In some examples, the first control signaling 220 may indicate one or more RBG size parameters 235 that may indicate an RBG size configuration. The RBG size configuration may associate different bandwidth part sizes with different RBG sizes that are to be used for one or more of the transmissions 240. Thus, RBGs of an RBG size (e.g., selected based on a RBG size parameter 235, a bandwidth part size, an RBG size configuration, or any combination thereof) may be used for indicating frequency domain resources (e.g., in the FDRA field(s) in the second control signaling 225). For example, the frequency domain resources may be indicated in terms of RBGs that are of the RBG size.

In some examples, the RBG size parameters 235 may apply to one or more instances of control signaling that may schedule the transmissions 240 (e.g., uplink transmissions, downlink transmissions, or both). In some examples, the RBG size parameters 235 may apply to one or more instances of control signaling that may schedule the transmissions 240 that are of a resource allocation type (e.g., a resource allocation type 0) in which frequency domain resources may be grouped into RBGs and assigned in terms of quantities of the RBGs.

In some approaches to multi-cell scheduling, RBG sizes may be limited. For example, RBG sizes may be limited to a maximum of 16 blocks for a BWP size of 145 RBs or greater. In such approaches where four transmissions may be scheduled with a BWP size of 273 RBs (e.g., which may correspond to 100 MHz with a subcarrier spacing of 30 kHz), a number of bits for an FDRA may be 76 bits. Such a quantity of bits may be considered to be a large or excessive payload overhead for control signaling (e.g., as compared to a payload of a DCI format used for single-cell scheduling, which may be in an approximate range of 50-70 bits). As such, alternative schemes may be desirable.

In some examples, a larger RBG size (e.g., an RBG size that is greater than 16) may be used in some cases in which a BWP size may be large (e.g., greater than or equal to 145 RBs). In this way, overhead for control signaling may be reduced.

For example, the UE 115-*a* may receive (e.g., from the network entity 105-*a*) the first control signaling 220 (e.g., that may be RRC control signaling) that may include one or more RBG size parameters 235-*a*. Such RBG size parameters 235 may be associated with the transmissions 240 that are to be transmitted on different cells (e.g., one RBG size parameter 235 per cell). For example, RBG size parameter 235-*a* may be associated with a first cell, RBG size parameter 235-*b* may be associated with a second cell, RBG size parameter 235-*c* may be associated with a third cell, and RBG size parameter 235-*d* may be associated with a fourth cell. Each RBG size parameter 235 may indicate an RBG size configuration that may associate BWP sizes with RBG sizes. For example, an RBG size parameter 235 may indicate that BWP sizes within a first range are associated with a first RBG size, BWP sizes withing a second range are associated with a second RBG size, and so on for multiple BWP sizes or BWP size ranges.

The UE 115-*a* may receive the second control signaling 225 that may schedule one or more transmissions (e.g., the transmissions 240). The transmissions 240 may be scheduled across one or more cells. For example, transmission 240-*a* may be scheduled to be transmitted on a first cell 255-*a*, transmission 240-*b* may be scheduled to be transmitted on a second cell 255-*b*, transmission 240-*c* may be scheduled to be transmitted on a third cell 255-*c*, and transmission 240-*d* may be scheduled to be transmitted on a fourth cell 255-*d*. The second control signaling 225 may further include a plurality of FDRA fields that may indicate RBGs over which the transmissions 240 are to be communicated. For example, a first FDRA field 250-*a* may indicate one or more RBGs over which transmission 240-*a* is to be transmitted, a second FDRA field 250-*b* may indicate one or more RBGs over which transmission 240-*b* is to be transmitted, a third FDRA field 250-*c* may indicate one or more RBGs over which transmission 240-*c* is to be transmitted, and a fourth FDRA field 250-*d* may indicate one or more RBGs over which transmission 240-*d* is to be transmitted. In some examples, RBG sizes of the RBGs may be based on BWP sizes associated with the individual cells over which the transmissions 240 are to be transmitted and these RBG sizes may be determined or selected from one or more RBG size configurations that are indicated in the RBG size parameters 235. For example, a BWP size of 50 RBs may result in an RBG size of 8, whereas a BWP size of 150 may result in an RBG size of 24, 31, 32, 48, 64, or any other value. In particular, some RBG sizes may be greater than 16 RBs. Different combinations or associations of BWP sizes and RBG sizes are possible and contemplated by the present disclosure.

The UE 115-*a* may communicate (e.g., transmit or receive) a first transmission 240-*a* of the transmissions 240 in one or more RBGs (e.g., as the data communications 230) and the one or more RBGs may be of an RBG size that corresponds with the BWP size based on the RBG size configuration indicated in the RBG size parameter in the first control signaling 220. For example, the UE 115-*a* may communicate the transmission 240-*a* with the network entity 105-*a*.

Figure 3A:
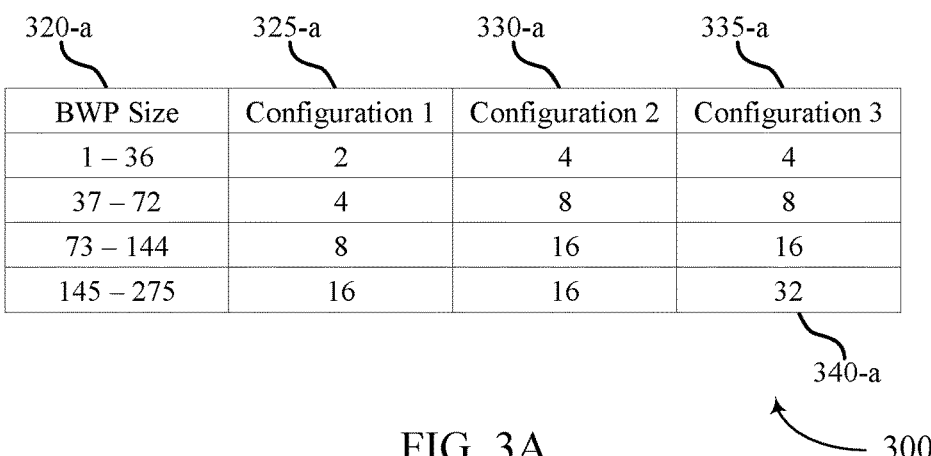
FIGS. 3A, 3B, and 3C illustrate examples of an RBG size scheme and an RBG size overhead comparison that support resource block group sizes in accordance with one or more examples as disclosed herein.
Figure 3B:
Figure 3C:
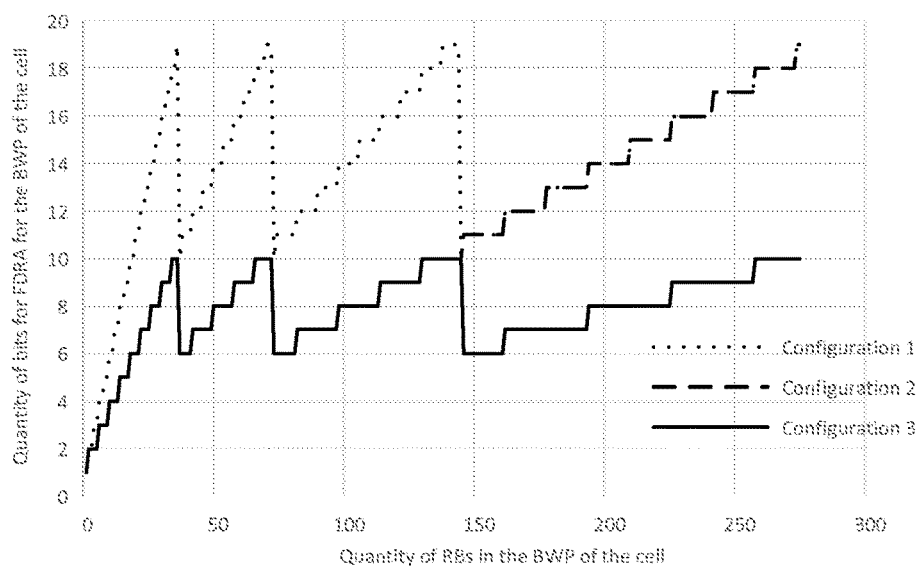

FIGS. 3A, 3B, and 3C illustrate examples of an RBG size scheme 300, another RBG size scheme 301, and an RBG size overhead comparison 302 that support that resource block group sizes in accordance with one or more examples as disclosed herein.

The example RBG size scheme 300 depicted in FIG. 3A may associate BWP sizes 320-*a* with various RBG sizes 340-*a* that may be indicated in different RBG size configurations, such as the first configuration 325-*a*, the second configuration 330-*a*, and the third configuration 335-*a*.

In some examples, the third configuration 335-*a* may be associated with transmissions (e.g., downlink shared channel transmissions, uplink shared channel transmissions, or both) that may be scheduled by control signaling, such as DCI signaling. Such DCI signaling may be of a format that may involve or be associated with scheduling of multiple transmissions (e.g., across multiple cells) in a single message, such as a DCI format 0_X or 1_X.

In some examples, a network entity or other wireless device may transmit control signaling such as RRC signaling that may include an RBG size parameter, such as rbg-SizeDCI-1-X-r18 that may be associated with DCI format 1_X or rbg-SizeDCI-0-X-r18 that may be associated with DCI format 0_X. Such RBG size parameters may be included in RRC signaling, such as in information elements (e.g., PDSCH-Config, PUSCH-Config, or both) that may be received by a UE. Such RBG size parameters may indicate an RBG size configuration (e.g., the first configuration 325-*a*, the second configuration 330-*a*, and the third configuration 335-*a*) that the UE is to use to determine an RBG size that is to be used for communications. For example, an RBG size parameter may indicate a value from possible values such as {config1, config2, config3}.

In some examples, the third configuration 335-*a* may be used. The third configuration 335-*a* may include a maximum RBG size (e.g., 32 or another value) that may be larger than maximum sizes of other configurations (e.g., the first configuration 325-*a*, the second configuration 330-*a*, or both). For example, the maximum value of the third configuration 335-*a* may be 32, 48, 64, or another value greater than 16, while maximum values of the first configuration 325-*a* and the second configuration 330-*a* may be 16. In this way, the network entity may configure the UE with a larger RBG size value, which may reduce overhead and increase reliability.

In some examples, transmissions (e.g., uplink shared channel transmissions, downlink shared channel transmissions, or both) that are associated with a resource allocation type (e.g., resource allocation type 0) by DCI formats other than control signaling formats (e.g., DCI formats) that schedule multiple transmissions across multiple cells in a single message (e.g., other than DCI formats 1_X and 0_X), different RBG size parameters may apply. For example, instead of rbg-SizeDCI-1-X-r18 or rbg-SizeDCI-0-X-r18, a parameter rbg-Size may be included in first control signaling (e.g., RRC control signaling). Such parameters may select an RBG configuration from fewer candidate configurations than other parameters (e.g., rbg-SizeDCI-1-X-r18 or rbg-SizeDCI-0-X-r18). That is, a first set of DCI formats may apply a first RGB size parameter to a first set of configurations and a second set of DCI formats may apply a second RGB size parameter to a second set of configurations. Further, in some examples of transmissions associated with other resource allocation types (e.g., resource allocation types that do not involve the use of RBGs), RBG size parameters and RBG size configurations may not be used.

Additionally, or alternatively, a network entity or other wireless device may transmit control signaling such as RRC signaling that may include other RBG size parameters, such as rbg-Size-r18 that may be associated with DCI formats other than DCI format 1_X or DCI format 0_X. Such DCI formats may not schedule multiple transmissions across multiple cells in a single control message and may instead schedule a single transmission in a single cell. In such scenarios, an RBG size parameter may be included in RRC signaling, such as in information elements (e.g., PDSCH-Config, PUSCH-Config, or both) that may be received by a UE. Such RBG size parameters may indicate an RBG size configuration (e.g., the first configuration 325-*a*, the second configuration 330-*a*, and the third configuration 335-*a*) that the UE is to use to determine an RBG size that is to be used for communications. For example, an RBG size parameter may indicate a value from possible values such as {config1, config2, config3}, which may correspond to the first configuration 325-*a*, the second configuration 330-*a*, and the third configuration 335-*a*, respectively.

Similar to the scenarios involving DCI formats 0_X and 1_X, some scenarios involving other DCI formats may also use the third configuration 335-*a*. The third configuration 335-*a* may include a maximum RBG size value 340-*a* (e.g., 32 or another value) that may be larger than maximum sizes of other configurations (e.g., the first configuration 325-*a*, the second configuration 330-*a*, or both). For example, the maximum RBG size value 340-*a* of the third configuration 335-*a* may be 32, 48, 64, or another value greater than 16, while maximum values of the first configuration 325-*a* and the second configuration 330-*a* may be 16.

Similar to the scenarios involving DCI formats 0_X and 1_X, some scenarios involving other DCI formats may involve transmissions (e.g., uplink shared channel transmissions, downlink shared channel transmissions, or both) that are associated with a resource allocation type 0 may involve the use of other RBG size parameters. For example, instead of rbg-Size-r18, a parameter rbg-Size may be included in first control signaling (e.g., RRC control signaling). Such parameters may select an RBG configuration from fewer candidate configurations than other parameters (e.g., from two configurations, such as the first configuration 325-*a* and the second configuration 330-*a*, but not the third configuration 335-*a*). Further, in some examples of transmissions associated with other resource allocation types (e.g., resource allocation types that do not involve the use of RBGs), RBG size parameters and RBG size configurations may not be used.

The example RBG size scheme 301 depicted in FIG. 3B may associate BWP sizes 320-*b* with various RBG size values 340-*b* that may be indicated in different RBG size configurations, such as the first configuration 325-*b* and the second configuration 330-*b*.

In some scenarios, such as transmissions scheduled by control signaling formats (e.g., DCI formats) that may schedule multiple transmissions across multiple cells in a single control message (e.g., DCI format 0_X, DCI format 1_X, or both), an increased RBG size in one or more RBG size configurations may be used based on satisfaction of one or more conditions. For example, the RBG size value 340-*b* of the second configuration 330-*b* may be 16 if one or more conditions are not satisfied, and the RBG size value 340-*b* of the second configuration 330-*b* may be 32, 48, 64, or another value greater than a maximum RBG size value 340-*b* of the first configuration 325-*b* (or another configuration) if one or more conditions are satisfied. For example, such conditions may include receiving an RBG parameter indicating an RBG size configuration (e.g., the first configuration 325-*b*, the second configuration 330-*b*, or another configuration), a format of a control message (e.g., a DCI format, such as DCI format 0_X, 1_X, or both), a BWP size (e.g., a BWP size greater than 145 RBs or another value of RBs), or any combination thereof.

In some examples, the increased or modified RBG size value of the second configuration 330-b may be used without explicit RRC configuration indicating the increased or modified size. For example, a UE may autonomously detect or determine that one or more of the conditions are satisfied and may operate with the increased RBG size value 340-b in the second configuration 330-b even if no RRC configuration explicitly indicates the increased or modified RBG size value 340-b.

The RBG size overhead comparison 302 depicted in FIG. 3C shows quantities of bits for FRDA fields resulting from different amounts of RBs used in a cell and different RBG size configurations being used. The example configurations shown in FIG. 3C correspond to the example configurations of FIG. 3A (e.g., configuration 1 corresponds to the first configuration 325-a, configuration 2 corresponds to the second configuration 330-a, and configuration 3 corresponds to the third configuration 335-a). Additionally, or alternatively, configuration 3 may corresponds to the second configuration 330-b that involves the increased or modified RBG size value 340-b that may be used as a result of satisfaction of one or more conditions. In either case, the benefits are demonstrated in the RBG size overhead comparison 302.

As shown in the RBG size overhead comparison 302, configuration 3 shows reduced bit overhead for FDRA fields as compared to configurations 1 and 2 when a quantity of RBs exceeds 145 RBs. This difference in overhead corresponds to the increased RBG size (e.g., 32) employed in the third configuration 335-a as compared to the first configuration 325-a and the second configuration 330-a. By reducing such overhead (e.g., through the use of the subject matter discussed herein), communications reliability, speeds, and efficiency may be increased, and energy consumption may be reduced.

Figure 4:
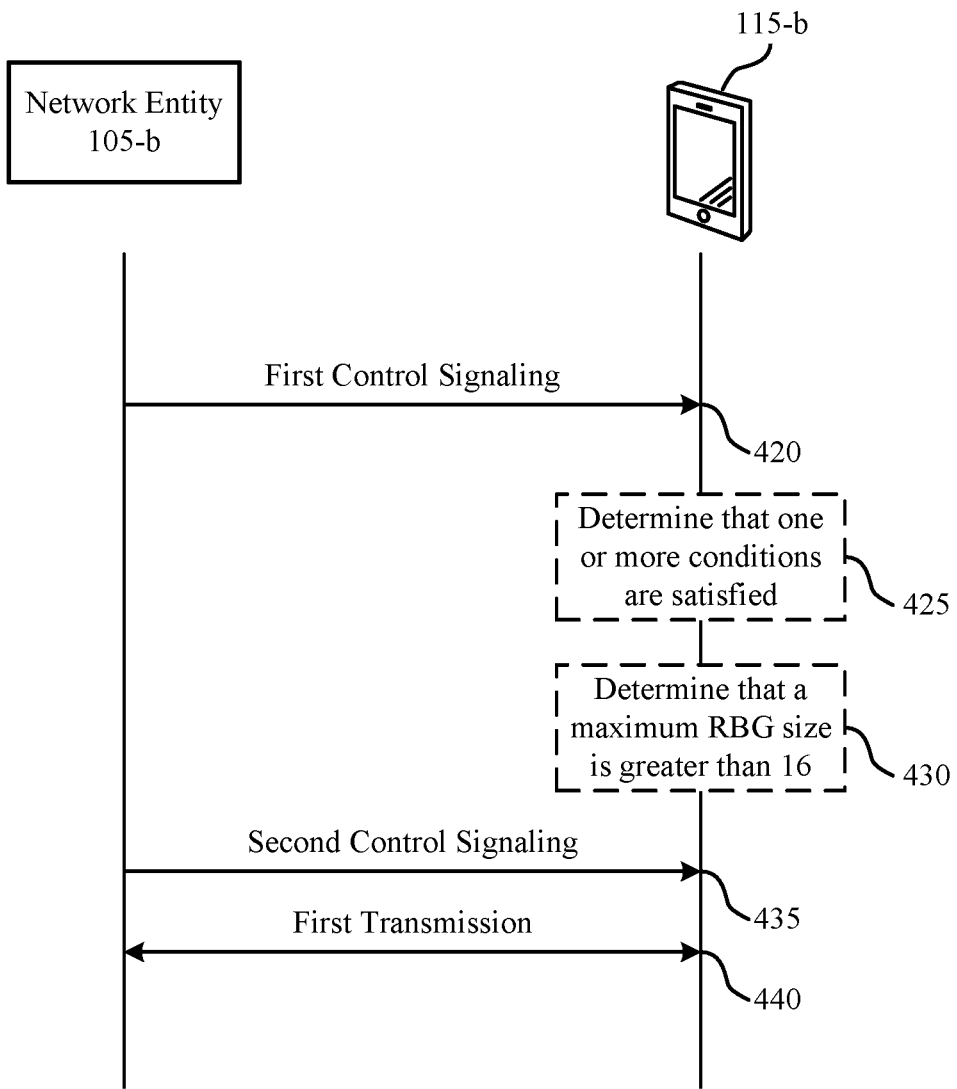
FIG. 4 illustrates an example of a process flow that supports resource block group sizes in accordance with one or more examples as disclosed herein.

FIG. 4 illustrates an example of a process flow 400 that supports resource block group sizes in accordance with one or more examples as disclosed herein. The process flow 400 may implement various aspects of the present disclosure described herein. The elements described in the process flow 400 (e.g., the UE 115-b and the network entity 105-b) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-b may receive a first control message that may include a first resource block group size parameter that indicates a first resource block group size configuration of a plurality of resource block group size configurations that associate bandwidth part sizes with resource block group sizes.

In some examples, the UE 115-b may receive the first control message that may include a plurality of resource block group size parameters associated with the plurality of cells and the plurality of resource block group size parameters may indicate respective resource block group size configurations of the plurality of resource block group size configurations and the plurality of resource block group size parameters may include the first resource block group size parameter In some examples, the plurality of resource block group size configurations may include at least three configurations. In some examples, the first resource block group size configuration may include a maximum resource block group size that is greater than all other maximum resource block group sizes comprised in the plurality of resource block group size configurations.

In some examples, the maximum resource block group size of the first resource block group size configuration is greater than sixteen resource blocks. For example, the maximum resource block group size of the first resource block group size configuration may be thirty-two resource blocks.

In some examples, the first resource block group size parameter is applicable to multiple transmissions scheduled by a single control message. In some examples, the first control message is a radio resource control message.

At 425, the UE 115-b may determine that one or more conditions are satisfied. In some examples, the one or more conditions may include receiving the first resource block group size parameter that may indicate the first resource block group size configuration, a format of the single second control message, a bandwidth part size, or any combination thereof.

At 430, the UE 115-b may determine that a maximum resource block group size of the first resource block group size configuration is greater than sixteen resource blocks based on determining that the one or more conditions are satisfied. In some examples, the first resource block group size is the maximum resource block group size of the first resource block group size configuration.

At 435, the UE 115-b may receive a single second control message scheduling a plurality of transmissions in a plurality of cells and that may include a corresponding plurality of frequency domain resource allocation fields that may indicate a plurality of resource block groups over which the plurality of transmissions are to be communicated. A plurality of resource block group sizes for the plurality of cells may be based on individual bandwidth part sizes associated with individual cells of the plurality of cells corresponding to individual resource block group sizes in the first resource block group size configuration. In some examples, the plurality of frequency domain resource allocation fields indicate the plurality of resource block groups in accordance with a resource allocation type that allocates resources corresponding to the first resource block group size. In some examples, the second control message is a downlink control information message.

At 440, the UE 115-b may communicate a first transmission of the plurality of transmissions in one or more resource block groups of the plurality of resource block groups in accordance with a first resource block group size of the plurality of resource block group sizes.

Figure 5:
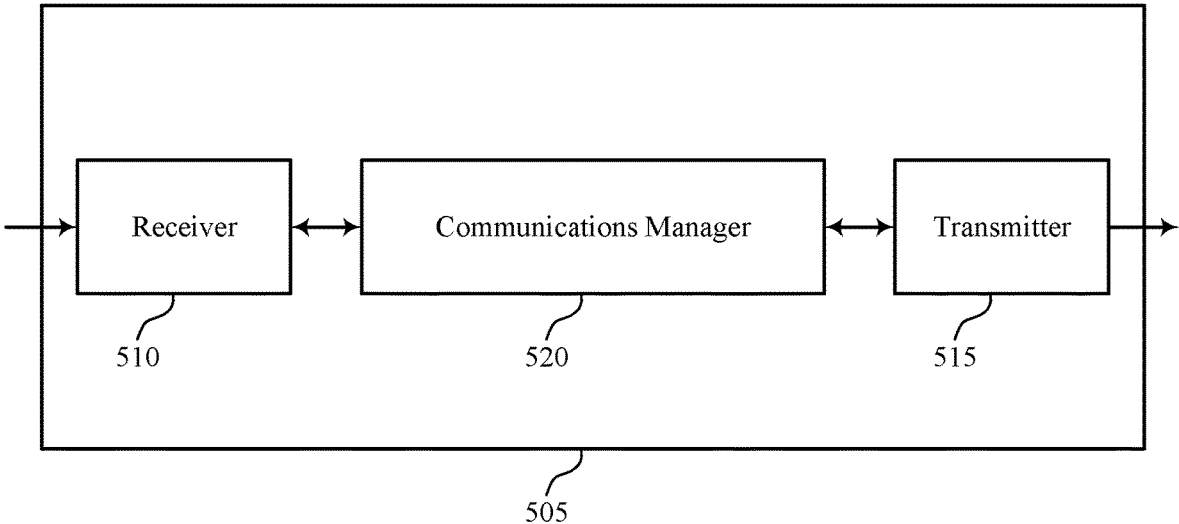
FIGS. 5 and 6 illustrate block diagrams of devices that support resource block group sizes in accordance with one or more examples as disclosed herein.
Figure 5:

FIG. 5 illustrates a block diagram 500 of a device 505 that supports resource block group sizes in accordance with one or more examples as disclosed herein. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource block group sizes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource block group sizes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource block group sizes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications at a UE in accordance with examples as disclosed herein. For example, the communications manager 520 may be configured as or otherwise support a means for receiving a first control message including a first resource block group size parameter that indicates a first resource block group size configuration of a set of multiple resource block group size configurations that associate bandwidth part sizes with resource block group sizes. The communications manager 520 may be configured as or otherwise support a means for receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The communications manager 520 may be configured as or otherwise support a means for communicating a first transmission of the set of multiple transmissions in one or more resource block groups of the set of multiple resource block groups in accordance with a first resource block group size of the set of multiple resource block group sizes.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:

FIG. 6 illustrates a block diagram 600 of a device 605 that supports resource block group sizes in accordance with one or more examples as disclosed herein. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource block group sizes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource block group sizes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource block group sizes as described herein. For example, the communications manager 620 may include a first control message component 625, a second control message component 630, a transmission communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The first control message component 625 may be configured as or otherwise support a means for receiving a first control message including a first resource block group size parameter that indicates a first resource block group size configuration of a set of multiple resource block group size configurations that associate bandwidth part sizes with resource block group sizes. The second control message component 630 may be configured as or otherwise support a means for receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The transmission communication component 635 may be configured as or otherwise support a means for communicating a first transmission of the set of multiple transmissions in one or more resource block groups of the set of multiple resource block groups in accordance with a first resource block group size of the set of multiple resource block group sizes.

Figure 7:
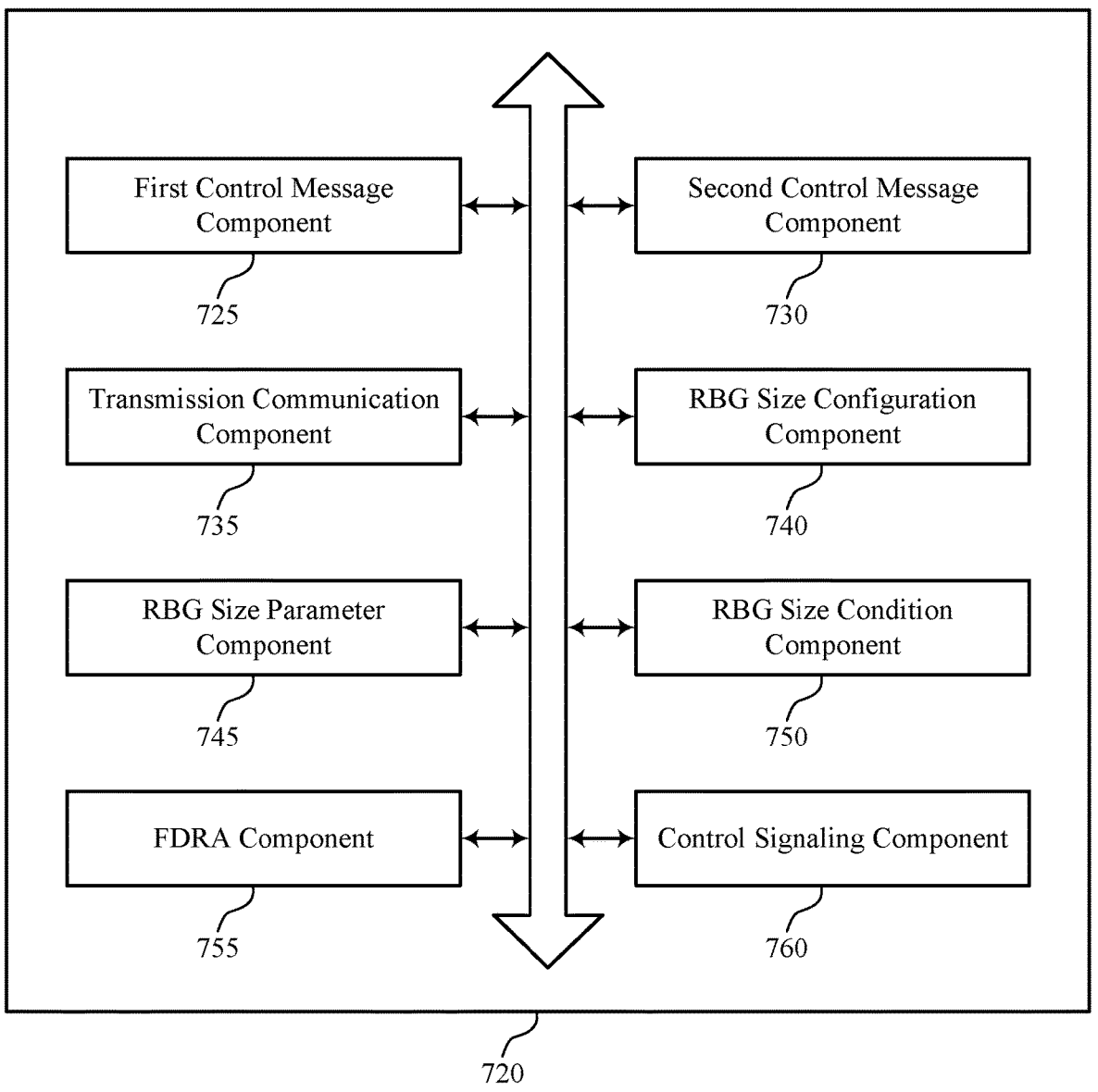
FIG. 7 illustrates a block diagram of a communications manager that supports resource block group sizes in accordance with one or more examples as disclosed herein.

FIG. 7 illustrates a block diagram 700 of a communications manager 720 that supports resource block group sizes in accordance with one or more examples as disclosed herein. The communications manager 720 may be an example of aspects of a communications manager 520, a communications manager 620, or both, as described herein. The communications manager 720, or various components thereof, may be an example of means for performing various aspects of resource block group sizes as described herein. For example, the communications manager 720 may include a first control message component 725, a second control message component 730, a transmission communication component 735, an RBG size configuration component 740, an RBG size parameter component 745, an RBG size condition component 750, an FDRA component 755, a control signaling component 760, or any combination thereof. Each of these components may communicate, directly or indirectly, with one another (e.g., via one or more buses).

Additionally, or alternatively, the communications manager 720 may support wireless communications at a UE in accordance with examples as disclosed herein. The first control message component 725 may be configured as or otherwise support a means for receiving a first control message including a first resource block group size parameter that indicates a first resource block group size configuration of a set of multiple resource block group size configurations that associate bandwidth part sizes with resource block group sizes. The second control message component 730 may be configured as or otherwise support a means for receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The transmission communication component 735 may be configured as or otherwise support a means for communicating a first transmission of the set of multiple transmissions in one or more resource block groups of the set of multiple resource block groups in accordance with a first resource block group size of the set of multiple resource block group sizes.

In some examples, the set of multiple resource block group size configurations includes at least three configurations. In some examples, the first resource block group size configuration includes a maximum resource block group size that is greater than all other maximum resource block group sizes included in the set of multiple resource block group size configurations.

In some examples, the maximum resource block group size of the first resource block group size configuration is greater than sixteen resource blocks.

In some examples, the first resource block group size parameter is applicable to multiple transmissions scheduled by a single control message.

In some examples, a maximum resource block group size of the first resource block group size configuration is greater than sixteen resource blocks.

In some examples, the RBG size condition component 750 may be configured as or otherwise support a means for determining that one or more conditions are satisfied. In some examples, the RBG size condition component 750 may be configured as or otherwise support a means for determining that a maximum resource block group size of the first resource block group size configuration is greater than sixteen resource blocks based on determining that the one or more conditions are satisfied. In some examples, the RBG size configuration component 740 may be configured as or otherwise support a means for where the first resource block group size is the maximum resource block group size of the first resource block group size configuration.

In some examples, the one or more conditions include receiving the first resource block group size parameter indicating the first resource block group size configuration, a format of the single second control message, a bandwidth part size, or any combination thereof.

In some examples, the first control message component 725 may be configured as or otherwise support a means for receiving the first control message including a set of multiple resource block group size parameters associated with the set of multiple cells, the set of multiple resource block group size parameters indicating respective resource block group size configurations of the set of multiple resource block group size configurations, where the set of multiple resource block group size parameters includes the first resource block group size parameter.

In some examples, the set of multiple frequency domain resource allocation fields indicate the set of multiple resource block groups in accordance with a resource allocation type that allocates resources corresponding to the first resource block group size.

In some examples, the first control message is a radio resource control message and the second control message is a downlink control information message.

Figure 8:
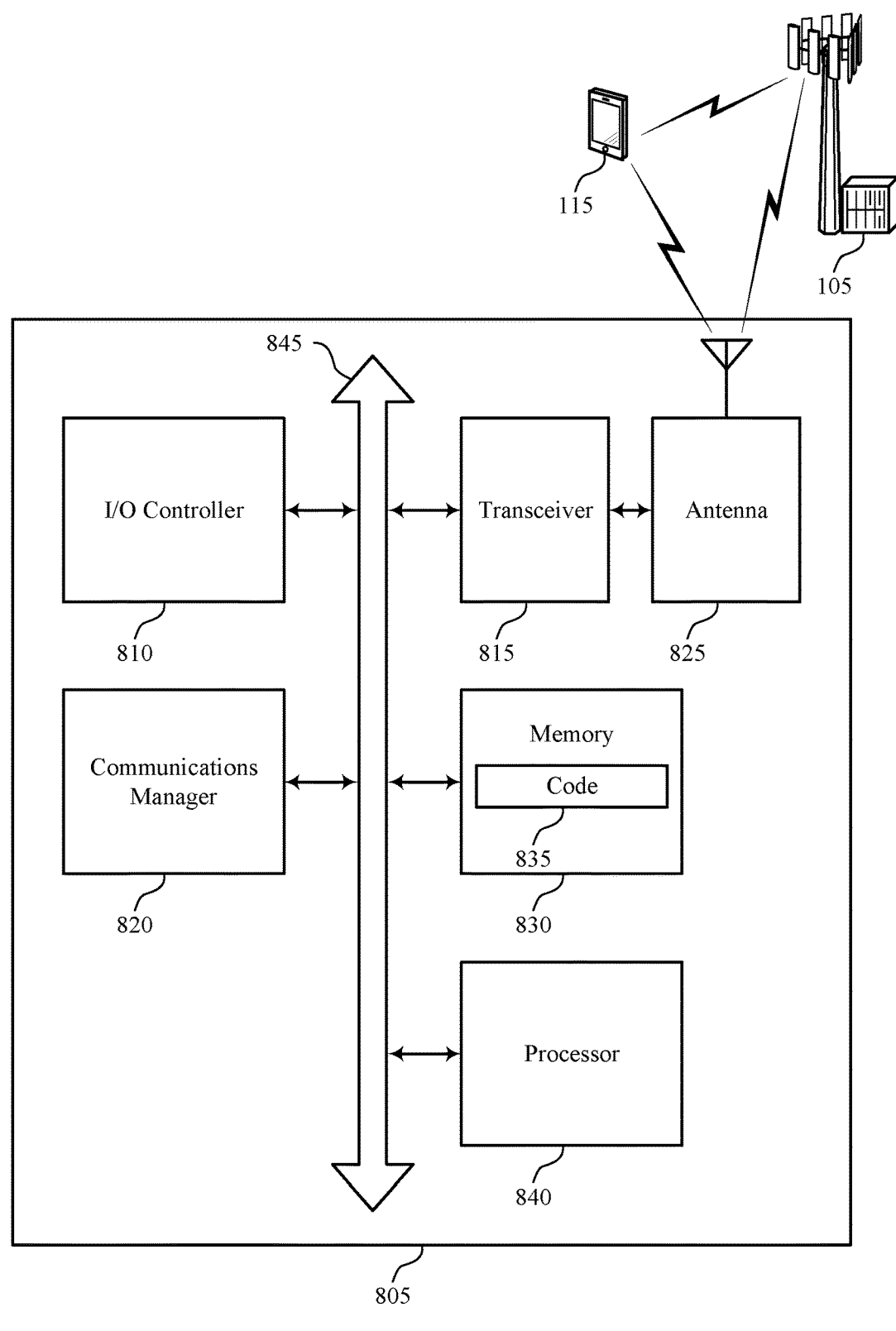
FIG. 8 illustrates a diagram of a system including a device that supports resource block group sizes in accordance with one or more examples as disclosed herein.

FIG. 8 illustrates a diagram of a system 800 including a device 805 that supports resource block group sizes in accordance with one or more examples as disclosed herein. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource block group sizes). For example, the device 805 or a component of the device 805 may include a processor 840 and memory 830 coupled with or to the processor 840, the processor 840 and memory 830 configured to perform various functions described herein.

Additionally, or alternatively, the communications manager 820 may support wireless communications at a UE in accordance with examples as disclosed herein. For example, the communications manager 820 may be configured as or otherwise support a means for receiving a first control message including a first resource block group size parameter that indicates a first resource block group size configuration of a set of multiple resource block group size configurations that associate bandwidth part sizes with resource block group sizes. The communications manager 820 may be configured as or otherwise support a means for receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The communications manager 820 may be configured as or otherwise support a means for communicating a first transmission of the set of multiple transmissions in one or more resource block groups of the set of multiple resource block groups in accordance with a first resource block group size of the set of multiple resource block group sizes.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource block group sizes as described herein, or the processor 840 and the memory 830 may be otherwise configured to perform or support such operations.

Figure 9:
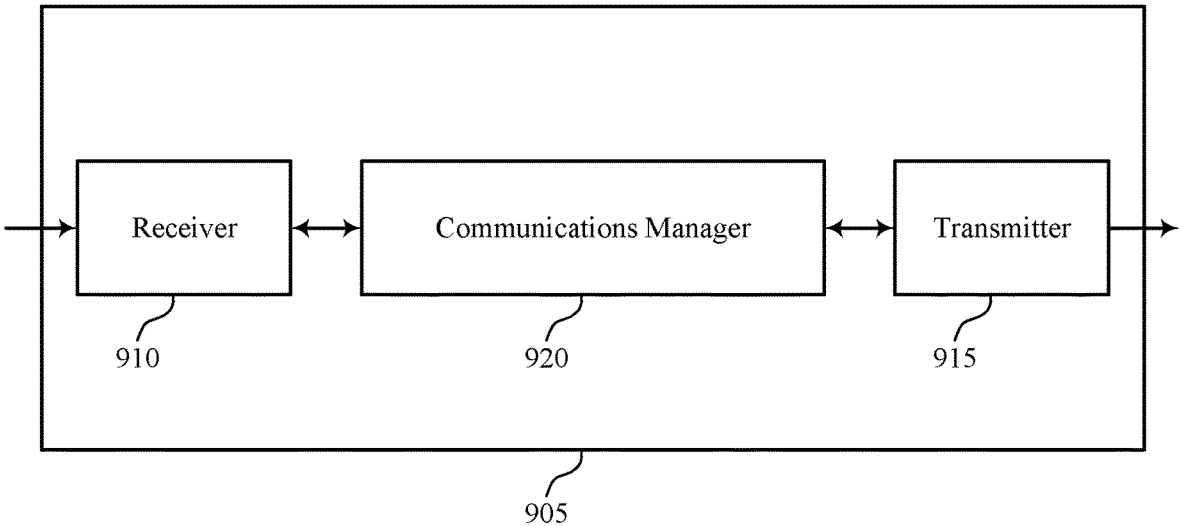
FIGS. 9 and 10 illustrate block diagrams of devices that support resource block group sizes in accordance with one or more examples as disclosed herein.

FIG. 9 illustrates a block diagram 900 of a device 905 that supports resource block group sizes in accordance with one or more examples as disclosed herein. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of resource block group sizes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications at a network entity in accordance with examples as disclosed herein. For example, the communications manager 920 may be configured as or otherwise support a means for transmitting a first control message including a first resource block group size parameter that indicates a first resource block group size configuration of a set of multiple resource block group size configurations that associate bandwidth part sizes with resource block group sizes. The communications manager 920 may be configured as or otherwise support a means for transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The communications manager 920 may be configured as or otherwise support a means for communicating a first transmission of the set of multiple transmissions in one or more resource block groups of the set of multiple resource block groups in accordance with a first resource block group size of the set of multiple resource block group sizes.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, more efficient utilization of communication resources, or any combination thereof.

Figure 10:
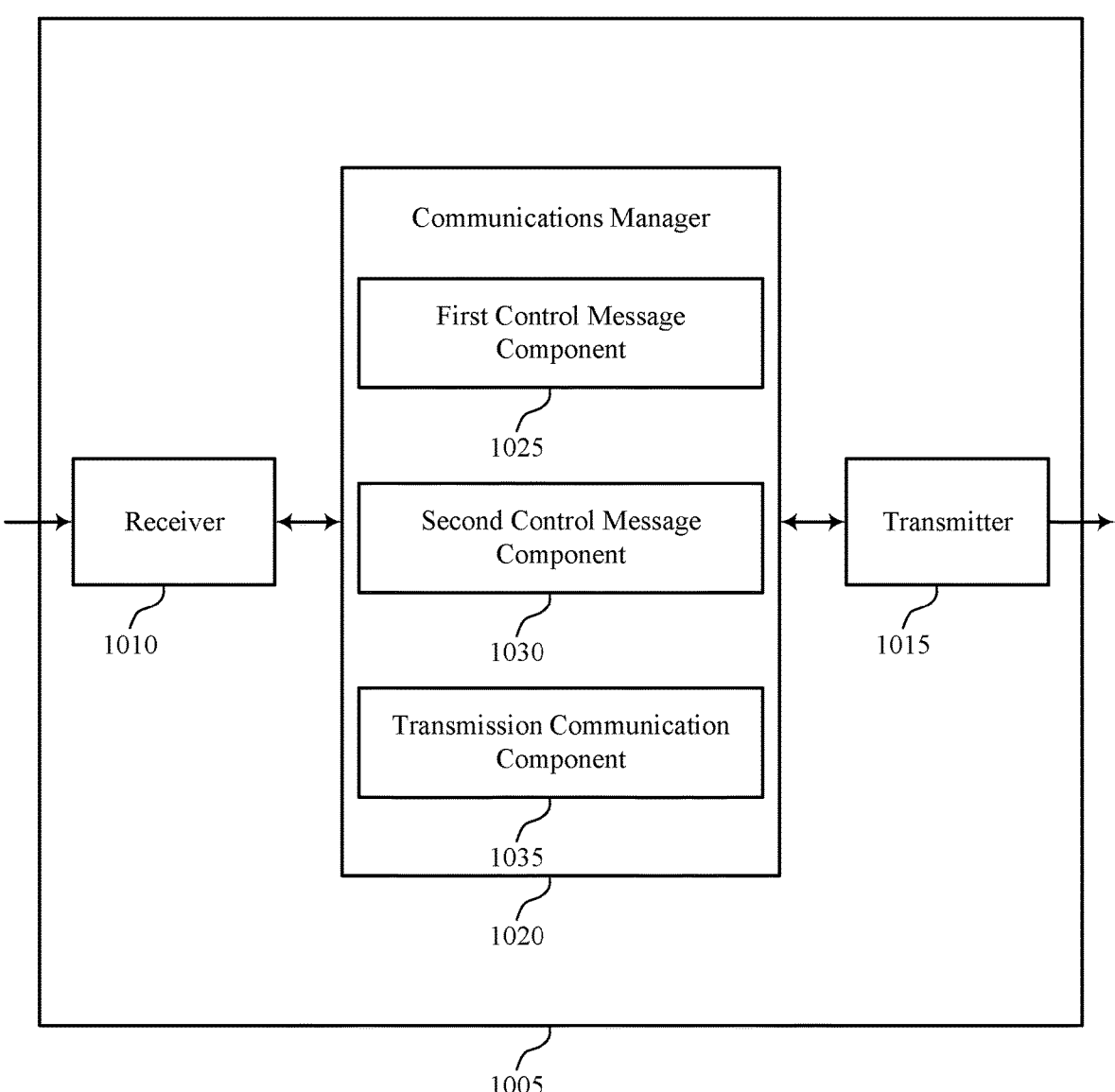

FIG. 10 illustrates a block diagram 1000 of a device 1005 that supports resource block group sizes in accordance with one or more examples as disclosed herein. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of resource block group sizes as described herein. For example, the communications manager 1020 may include a first control message component 1025, a second control message component 1030, a transmission communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The first control message component 1025 may be configured as or otherwise support a means for transmitting a first control message including a first resource block group size parameter that indicates a first resource block group size configuration of a set of multiple resource block group size configurations that associate bandwidth part sizes with resource block group sizes. The second control message component 1030 may be configured as or otherwise support a means for transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The transmission communication component 1035 may be configured as or otherwise support a means for communicating a first transmission of the set of multiple transmissions in one or more resource block groups of the set of multiple resource block groups in accordance with a first resource block group size of the set of multiple resource block group sizes.

Figure 11:
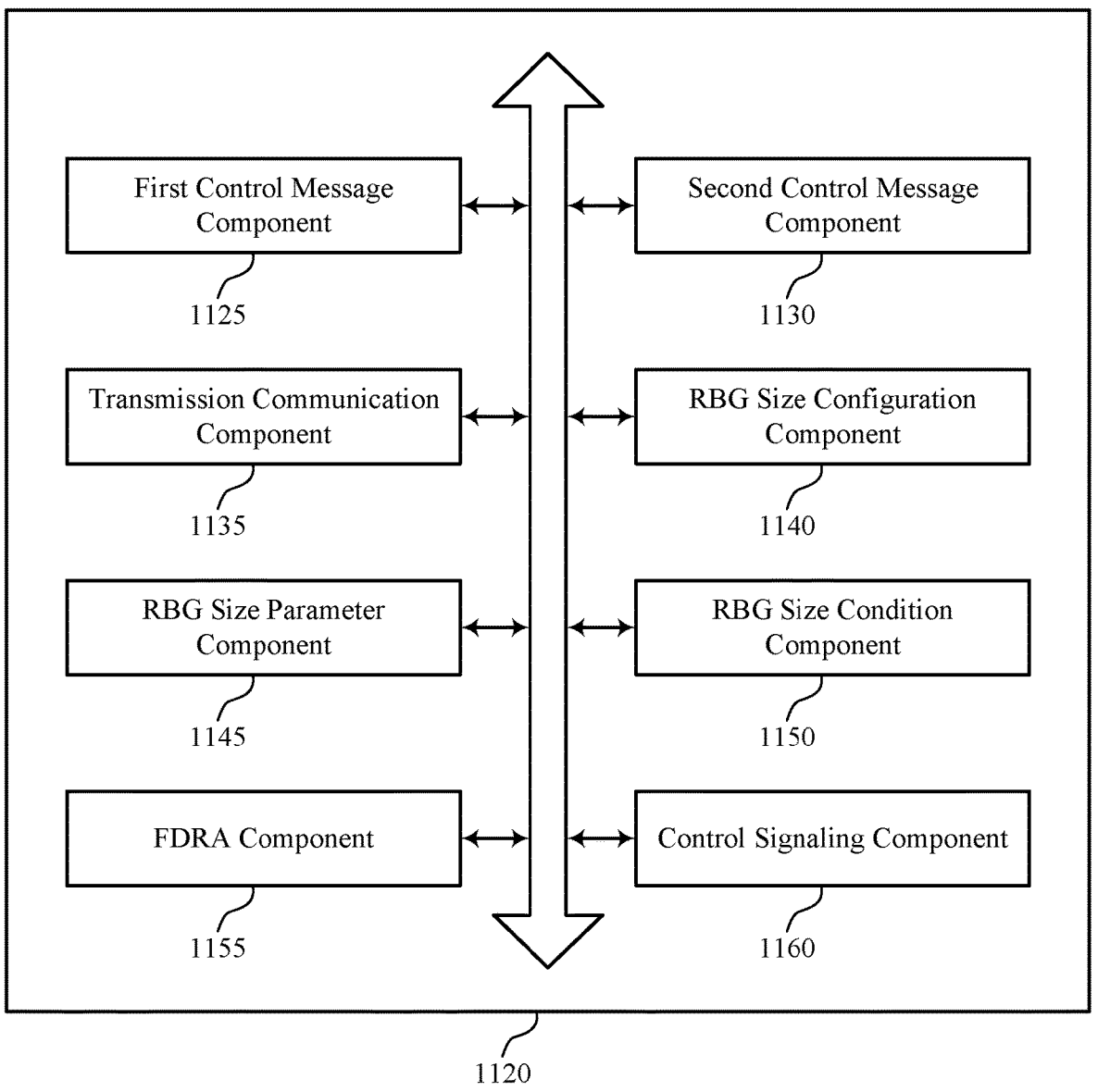
FIG. 11 illustrates a block diagram of a communications manager that supports resource block group sizes in accordance with one or more examples as disclosed herein.

FIG. 11 illustrates a block diagram 1100 of a communications manager 1120 that supports resource block group sizes in accordance with one or more examples as disclosed herein. The communications manager 1120 may be an example of aspects of a communications manager 920, a communications manager 1020, or both, as described herein. The communications manager 1120, or various components thereof, may be an example of means for performing various aspects of resource block group sizes as described herein. For example, the communications manager 1120 may include a first control message component 1125, a second control message component 1130, a transmission communication component 1135, an RBG size configuration component 1140, an RBG size parameter component 1145, an RBG size condition component 1150, an FDRA component 1155, a control signaling component 1160, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1120 may support wireless communications at a network entity in accordance with examples as disclosed herein. The first control message component 1125 may be configured as or otherwise support a means for transmitting a first control message including a first resource block group size parameter that indicates a first resource block group size configuration of a set of multiple resource block group size configurations that associate bandwidth part sizes with resource block group sizes. The second control message component 1130 may be configured as or otherwise support a means for transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The transmission communication component 1135 may be configured as or otherwise support a means for communicating a first transmission of the set of multiple transmissions in one or more resource block groups of the set of multiple resource block groups in accordance with a first resource block group size of the set of multiple resource block group sizes.

In some examples, the set of multiple resource block group size configurations includes at least three configurations. In some examples, the first resource block group size configuration includes a maximum resource block group size that is greater than all other maximum resource block group sizes included in the set of multiple resource block group size configurations.

In some examples, the maximum resource block group size of the first resource block group size configuration is greater than sixteen resource blocks.

In some examples, the first resource block group size parameter is applicable to multiple transmissions scheduled by a single control message.

In some examples, a maximum resource block group size of the first resource block group size configuration is greater than sixteen resource blocks.

In some examples, the RBG size condition component 1150 may be configured as or otherwise support a means for determining that one or more conditions are satisfied. In some examples, the RBG size condition component 1150 may be configured as or otherwise support a means for determining that a maximum resource block group size of the first resource block group size configuration is greater than sixteen resource blocks based on determining that the one or more conditions are satisfied. In some examples, the RBG size configuration component 1140 may be configured as or otherwise support a means for where the first resource block group size is the maximum resource block group size of the first resource block group size configuration.

In some examples, the one or more conditions include receiving the first resource block group size parameter indicating the first resource block group size configuration, a format of the single second control message, a bandwidth part size, or any combination thereof.

In some examples, the first control message component 1125 may be configured as or otherwise support a means for transmitting the first control message including a set of multiple resource block group size parameters associated with the set of multiple cells, the set of multiple resource block group size parameters indicating respective resource block group size configurations of the set of multiple resource block group size configurations, where the set of multiple resource block group size parameters includes the first resource block group size parameter.

In some examples, the set of multiple frequency domain resource allocation fields indicate the set of multiple resource block groups in accordance with a resource allocation type that allocates resources corresponding to the first resource block group size.

In some examples, the first control message is a radio resource control message and the second control message is a downlink control information message.

Figure 12:
FIG. 12 illustrates a diagram of a system including a device that supports resource block group sizes in accordance with one or more examples as disclosed herein.

FIG. 12 illustrates a diagram of a system 1200 including a device 1205 that supports resource block group sizes in accordance with one or more examples as disclosed herein. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting resource block group sizes). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

Additionally, or alternatively, the communications manager 1220 may support wireless communications at a network entity in accordance with examples as disclosed herein. For example, the communications manager 1220 may be configured as or otherwise support a means for transmitting a first control message including a first resource block group size parameter that indicates a first resource block group size configuration of a set of multiple resource block group size configurations that associate bandwidth part sizes with resource block group sizes. The communications manager 1220 may be configured as or otherwise support a means for transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The communications manager 1220 may be configured as or otherwise support a means for communicating a first transmission of the set of multiple transmissions in one or more resource block groups of the set of multiple resource block groups in accordance with a first resource block group size of the set of multiple resource block group sizes.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of resource block group sizes as described herein, or the processor 1235 and the memory 1225 may be otherwise configured to perform or support such operations.

FIG. 13 illustrates a flowchart showing a method 1300 that supports resource block group sizes in accordance with one or more examples as disclosed herein. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first control message including a first resource block group size parameter that indicates a first resource block group size configuration of a set of multiple resource block group size configurations that associate bandwidth part sizes with resource block group sizes. The operations of 1305 may be performed in accordance with examples as disclosed herein. In some examples, aspects of the operations of 1305 may be performed by a first control message component 725 as described with reference to FIG. 7.

At 1310, the method may include receiving a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The operations of 1310 may be performed in accordance with examples as disclosed herein. In some examples, aspects of the operations of 1310 may be performed by a second control message component 730 as described with reference to FIG. 7.

At 1315, the method may include communicating a first transmission of the set of multiple transmissions in one or more resource block groups of the set of multiple resource block groups in accordance with a first resource block group size of the set of multiple resource block group sizes. The operations of 1315 may be performed in accordance with examples as disclosed herein. In some examples, aspects of the operations of 1315 may be performed by a transmission communication component 735 as described with reference to FIG. 7.

FIG. 14 illustrates a flowchart showing a method 1400 that supports resource block group sizes in accordance with one or more examples as disclosed herein. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a first control message including a first resource block group size parameter that indicates a first resource block group size configuration of a set of multiple resource block group size configurations that associate bandwidth part sizes with resource block group sizes. The operations of 1405 may be performed in accordance with examples as disclosed herein. In some examples, aspects of the operations of 1405 may be performed by a first control message component 1125 as described with reference to FIG. 11.

At 1410, the method may include transmitting a single second control message scheduling a set of multiple transmissions in a set of multiple cells and including a corresponding set of multiple frequency domain resource allocation fields indicating a set of multiple resource block groups over which the set of multiple transmissions are to be communicated, where a set of multiple resource block group sizes for the set of multiple cells are based on individual bandwidth part sizes associated with individual cells of the set of multiple cells corresponding to individual resource block group sizes in the first resource block group size configuration. The operations of 1410 may be performed in accordance with examples as disclosed herein. In some examples, aspects of the operations of 1410 may be performed by a second control message component 1130 as described with reference to FIG. 11.

At 1415, the method may include communicating a first transmission of the set of multiple transmissions in one or more resource block groups of the set of multiple resource block groups in accordance with a first resource block group size of the set of multiple resource block group sizes. The operations of 1415 may be performed in accordance with examples as disclosed herein. In some examples, aspects of the operations of 1415 may be performed by a transmission communication component 1135 as described with reference to FIG. 11.

The following provides an overview of aspects of the present disclosure:

Aspect 1: A method for wireless communications at a UE, comprising: receiving a first control message comprising a first resource block group size parameter that indicates a first resource block group size configuration of a plurality of resource block group size configurations that associate bandwidth part sizes with resource block group sizes; receiving a single second control message scheduling a plurality of transmissions in a plurality of cells and comprising a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and communicating a first transmission of the plurality of transmissions in one or more resource block groups of the plurality of resource block groups in accordance with a first resource block group size of the plurality of resource block group sizes.

Aspect 2: The method of aspect 1, wherein the plurality of resource block group size configurations comprises at least three configurations; and the first resource block group size configuration comprises a maximum resource block group size that is greater than all other maximum resource block group sizes comprised in the plurality of resource block group size configurations.

Aspect 3: The method of aspect 2, wherein the maximum resource block group size of the first resource block group size configuration is greater than sixteen resource blocks.

Aspect 4: The method of any of aspects 1 through 3, wherein the first resource block group size parameter is applicable to multiple transmissions scheduled by a single control message.

Aspect 5: The method of aspect 4, wherein a maximum resource block group size of the first resource block group size configuration is greater than sixteen resource blocks.

Aspect 6: The method of any of aspects 1 through 5, further comprising: determining that one or more conditions are satisfied; determining that a maximum resource block group size of the first resource block group size configuration is greater than sixteen resource blocks based at least in part on determining that the one or more conditions are satisfied; and wherein the first resource block group size is the maximum resource block group size of the first resource block group size configuration.

Aspect 7: The method of aspect 6, wherein the one or more conditions comprise receiving the first resource block group size parameter indicating the first resource block group size configuration, a format of the single second control message, a bandwidth part size, or any combination thereof.

Aspect 8: The method of any of aspects 1 through 7, further comprising: receiving the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

Aspect 9: The method of any of aspects 1 through 8, wherein the plurality of frequency domain resource allocation fields indicate the plurality of resource block groups in accordance with a resource allocation type that allocates resources corresponding to the first resource block group size.

Aspect 10: The method of any of aspects 1 through 9, wherein the first control message is a radio resource control message and the second control message is a downlink control information message.

Aspect 11: A method for wireless communications at a network entity, comprising: transmitting a first control message comprising a first resource block group size parameter that indicates a first resource block group size configuration of a plurality of resource block group size configurations that associate bandwidth part sizes with resource block group sizes; transmitting a single second control message scheduling a plurality of transmissions in a plurality of cells and comprising a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and communicating a first transmission of the plurality of transmissions in one or more resource block groups of the plurality of resource block groups in accordance with a first resource block group size of the plurality of resource block group sizes.

Aspect 12: The method of aspect 11, wherein the plurality of resource block group size configurations comprises at least three configurations; and the first resource block group size configuration comprises a maximum resource block group size that is greater than all other maximum resource block group sizes comprised in the plurality of resource block group size configurations.

Aspect 13: The method of aspect 12, wherein the maximum resource block group size of the first resource block group size configuration is greater than sixteen resource blocks.

Aspect 14: The method of any of aspects 11 through 13, wherein the first resource block group size parameter is applicable to multiple transmissions scheduled by a single control message.

Aspect 15: The method of aspect 14, wherein a maximum resource block group size of the first resource block group size configuration is greater than sixteen resource blocks.

Aspect 16: The method of any of aspects 11 through 15, further comprising: determining that one or more conditions are satisfied; determining that a maximum resource block group size of the first resource block group size configuration is greater than sixteen resource blocks based at least in part on determining that the one or more conditions are satisfied; and wherein the first resource block group size is the maximum resource block group size of the first resource block group size configuration.

Aspect 17: The method of aspect 16, wherein the one or more conditions comprise receiving the first resource block group size parameter indicating the first resource block group size configuration, a format of the single second control message, a bandwidth part size, or any combination thereof.

Aspect 18: The method of any of aspects 11 through 17, further comprising: transmitting the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

Aspect 19: The method of any of aspects 11 through 18, wherein the plurality of frequency domain resource allocation fields indicate the plurality of resource block groups in accordance with a resource allocation type that allocates resources corresponding to the first resource block group size.

Aspect 20: The method of any of aspects 11 through 19, wherein the first control message is a radio resource control message and the second control message is a downlink control information message.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a network entity, comprising a processor; memory coupled with the processor; and instructions stored in the memory and executable by the processor to cause the apparatus to perform a method of any of aspects 11 through 20.

Aspect 25: An apparatus for wireless communications at a network entity, comprising at least one means for performing a method of any of aspects 11 through 20.

Aspect 26: A non-transitory computer-readable medium storing code for wireless communications at a network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more memories storing processor-executable code; and
   one or more processors coupled with the one or more memories and operable to execute the code to cause the one or more processors, individually or collectively, to:
      receive a first control message comprising a first resource block group size parameter that indicates a first resource block group size configuration of a plurality of resource block group size configurations that associate bandwidth part sizes with resource block group sizes;
      receive a single second control message of a first control information format that schedules a plurality of transmissions in a plurality of cells and comprises a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and
      communicate a first transmission of the plurality of transmissions in one or more resource block groups of the plurality of resource block groups in accordance with a first resource block group size of the plurality of resource block group sizes, wherein, for the first resource block group size configuration and for a bandwidth part size of one of the plurality of cells, the first resource block group size is selected from a first value corresponding to the first control information format and a second value corresponding to a second control information format.

2. The apparatus of claim 1, wherein:
   the plurality of resource block group size configurations comprises at least three configurations; and
   the first resource block group size configuration comprises a maximum resource block group size that is greater than all other maximum resource block group sizes comprised in the plurality of resource block group size configurations.

3. The apparatus of claim 2, wherein:
   the maximum resource block group size of the first resource block group size configuration is greater than sixteen resource blocks.

4. The apparatus of claim 1, wherein the first resource block group size parameter is applicable to multiple transmissions scheduled by a single control message.

5. The apparatus of claim 4, wherein:
   a maximum resource block group size of the first resource block group size configuration is greater than sixteen resource blocks.

6. The apparatus of claim 1, wherein the one or more processors are further operable to execute the code to cause the one or more processors, individually or collectively, to:
   determine that one or more conditions are satisfied; and
   determine that a maximum resource block group size of the first resource block group size configuration is greater than sixteen resource blocks based at least in part on determining that the one or more conditions are satisfied;
   wherein the first resource block group size is the maximum resource block group size of the first resource block group size configuration.

7. The apparatus of claim 6, wherein the one or more conditions comprise receiving the first resource block group size parameter indicating the first resource block group size configuration, the first control information format of the single second control message, a bandwidth part size, or any combination thereof.

8. The apparatus of claim 1, wherein the one or more processors are further operable to execute the code to cause the one or more processors, individually or collectively, to:
   receive the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

9. The apparatus of claim 1, wherein the plurality of frequency domain resource allocation fields indicate plurality of resource block groups in accordance with a resource allocation type that allocates resources corresponding to the first resource block group size.

10. The apparatus of claim 1, wherein the first control message is a radio resource control message and the second control message is a downlink control information message.

11. An apparatus for wireless communications at a network entity, comprising:
   one or more memories storing processor-executable code; and
   one or more processors coupled with the one or more memories and operable to execute the code to cause the one or more processors, individually or collectively, to:
      transmit a first control message comprising a first resource block group size parameter that indicates a first resource block group size configuration of a plurality of resource block group size configurations that associate bandwidth part sizes with resource block group sizes;
      transmit a single second control message of a first control information format that schedules a plurality of transmissions in a plurality of cells and comprises a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and communicate a first transmission of the plurality of transmissions in one or more resource block groups of the plurality of resource block groups in accordance with a first resource block group size of the plurality of resource block group sizes, wherein, for the first resource block group size configuration and for a bandwidth part size of one of the plurality of cells, the first resource block group size is selected from a first value corresponding to the first control information format and a second value corresponding to a second control information format.

12. The apparatus of claim 11, wherein:
the plurality of resource block group size configurations comprises at least three configurations; and
the first resource block group size configuration comprises a maximum resource block group size that is greater than all other maximum resource block group sizes comprised in the plurality of resource block group size configurations.

13. The apparatus of claim 12, wherein:
the maximum resource block group size of the first resource block group size configuration is greater than sixteen resource blocks.

14. The apparatus of claim 11, wherein the first resource block group size parameter is applicable to multiple transmissions scheduled by a single control message.

15. The apparatus of claim 14, wherein:
a maximum resource block group size of the first resource block group size configuration is greater than sixteen resource blocks.

16. The apparatus of claim 11, wherein the one or more processors are further operable to execute the code to cause the one or more processors, individually or collectively, to:
determine that one or more conditions are satisfied; and
determine that a maximum resource block group size of the first resource block group size configuration is greater than sixteen resource blocks based at least in part on determining that the one or more conditions are satisfied;
wherein the first resource block group size is the maximum resource block group size of the first resource block group size configuration.

17. The apparatus of claim 16, wherein the one or more conditions comprise receiving the first resource block group size parameter indicating the first resource block group size configuration, the first control information format of the single second control message, a bandwidth part size, or any combination thereof.

18. The apparatus of claim 11, wherein the one or more processors are further operable to execute the code to cause the one or more processors, individually or collectively, to:
transmit the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

19. The apparatus of claim 11, wherein the plurality of frequency domain resource allocation fields indicate the plurality of resource block groups in accordance with a resource allocation type that allocates resources corresponding to the first resource block group size.

20. The apparatus of claim 11, wherein the first control message is a radio resource control message and the second control message is a downlink control information message.

21. A method for wireless communications at a user equipment (UE), comprising:
receiving a first control message comprising a first resource block group size parameter that indicates a first resource block group size configuration of a plurality of resource block group size configurations that associate bandwidth part sizes with resource block group sizes;
receiving a single second control message of a first control information format that schedules a plurality of transmissions in a plurality of cells and comprises a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and
communicating a first transmission of the plurality of transmissions in one or more resource block groups of the plurality of resource block groups in accordance with a first resource block group size of the plurality of resource block group sizes, wherein, for the first resource block group size configuration and for a bandwidth part size of one of the plurality of cells, the first resource block group size is selected from a first value corresponding to the first control information format and a second value corresponding to a second control information format.

22. The method of claim 21, wherein:
the plurality of resource block group size configurations comprises at least three configurations; and
the first resource block group size configuration comprises a maximum resource block group size that is greater than all other maximum resource block group sizes comprised in the plurality of resource block group size configurations.

23. The method of claim 21, wherein the first resource block group size parameter is applicable to multiple transmissions scheduled by a single control message.

24. The method of claim 21, further comprising:
determining that one or more conditions are satisfied; and
determining that a maximum resource block group size of the first resource block group size configuration is greater than sixteen resource blocks based at least in part on determining that the one or more conditions are satisfied;
wherein the first resource block group size is the maximum resource block group size of the first resource block group size configuration.

25. The method of claim 21, further comprising:
receiving the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

26. A method for wireless communications at a network entity, comprising:

transmitting a first control message comprising a first resource block group size parameter that indicates a first resource block group size configuration of a plurality of resource block group size configurations that associate bandwidth part sizes with resource block group sizes;

transmitting a single second control message that is of a first control information format and that schedules a plurality of transmissions in a plurality of cells and comprises a corresponding plurality of frequency domain resource allocation fields indicating a plurality of resource block groups over which the plurality of transmissions are to be communicated, wherein a plurality of resource block group sizes for the plurality of cells are based at least in part on individual bandwidth part sizes associated with individual cells of the plurality of cells corresponding to individual resource block group sizes in the first resource block group size configuration; and communicating a first transmission of the plurality of transmissions in one or more resource block groups of the plurality of resource block groups in accordance with a first resource block group size of the plurality of resource block group sizes, wherein, for the first resource block group size configuration and for a bandwidth part size of one of the plurality of cells, the first resource block group size is selected from a first value corresponding to the first control information format and a second value corresponding to a second control information format.

27. The method of claim 26, wherein:

the plurality of resource block group size configurations comprises at least three configurations; and the first resource block group size configuration comprises a maximum resource block group size that is greater than all other maximum resource block group sizes comprised in the plurality of resource block group size configurations.

28. The method of claim 26, wherein the first resource block group size parameter is applicable to multiple transmissions scheduled by a single control message.

29. The method of claim 26, further comprising:

determining that one or more conditions are satisfied; and determining that a maximum resource block group size of the first resource block group size configuration is greater than sixteen resource blocks based at least in part on determining that the one or more conditions are satisfied;

wherein the first resource block group size is the maximum resource block group size of the first resource block group size configuration.

30. The method of claim 26, further comprising:

transmitting the first control message comprising a plurality of resource block group size parameters associated with the plurality of cells, the plurality of resource block group size parameters indicating respective resource block group size configurations of the plurality of resource block group size configurations, wherein the plurality of resource block group size parameters comprises the first resource block group size parameter.

* * * * *